United States Patent [19]
Stodt et al.

[11] Patent Number: 5,644,941
[45] Date of Patent: Jul. 8, 1997

[54] METHOD AND ARRANGEMENT FOR SEVERING AND CONTROLLED COOLING OF INDIVIDUAL RODS FROM A ROLLED SECTION

[75] Inventors: Rolf Stodt, Kaarst; Hans Peter Drügh, Zülpich, both of Germany

[73] Assignee: SMS Schloemann-Siemag Aktiengesellschaft, Dusseldorf, Germany

[21] Appl. No.: 450,973

[22] Filed: May 25, 1995

[30] Foreign Application Priority Data

May 31, 1994 [DE] Germany ............ 44 18 917.6

[51] Int. Cl.$^6$ .................................................. B23D 25/12
[52] U.S. Cl. ..................... 72/201; 72/203; 83/158; 83/345
[58] Field of Search ............... 72/200, 201, 202, 72/203, 250, 251; 83/158, 343, 345

[56] References Cited

U.S. PATENT DOCUMENTS 3,220,293 11/1965 Barber ............................. 83/345
3,841,180 10/1974 Gütlbauer et al. ............... 72/203
4,176,535 12/1979 Elsner et al. ..................... 72/203
4,307,594 12/1981 Steinbock ........................ 72/203
4,834,345 5/1989 Kanbara et al. ................. 72/202

FOREIGN PATENT DOCUMENTS 622505 11/1935 Germany.

Primary Examiner—Lowell A. Larson
Assistant Examiner—Thomas C. Schoeffler
Attorney, Agent, or Firm—Friedrich Kueffner

[57] ABSTRACT

A method and an arrangement for severing and controlled cooling of individual rods from a rolled section, particularly from a section of preferably high-grade steel which emerges hot from rolling at final speed from the rolling line of a finishing train, wherein the section is divided during its passage through parting shears into cut lengths and wherein a cut length each is conveyed after severing to an annealing strip or an annealing furnace. The rolled section is supplied to parting shears whose knives rotate on both sides of the section in a horizontal plane and which, when severing the section, displace the resulting section ends in the horizontal plane laterally relative to each other by a certain distance.

11 Claims, 4 Drawing Sheets

METHOD AND ARRANGEMENT FOR SEVERING AND CONTROLLED COOLING OF INDIVIDUAL RODS FROM A ROLLED SECTION

BACKGROUND OF THE INVENTION

1. Field of the Invention

The present invention relates to a method and an arrangement for severing and controlled cooling of individual rods from a rolled section, particularly from a section of preferably high-grade steel which emerges hot from rolling at final speed from the rolling line of a finishing train, wherein the section is divided during its passage through parting shears into cut lengths and wherein a cut length each is conveyed after severing to an annealing strip or an annealing furnace.

2. Description of the Related Art

It is known in the art to divide rolled material and particularly light-section material into cooling bed lengths by means of rotation shears having knives which rotate in a vertical plane and, for example, by means of a cutting length optimizing means which interacts with the rotation shears. The rods are then conducted onto a rake-type cooling bank over a supply chute with switch. Fans may be arranged underneath the cooling bed for achieving a fast cooling. After the cooling process, the sections are collected in rod groups and are divided into commercial lengths by cold shears or an abrasive cutting-off machine. A transverse conveyor then conveys the material to a stacking unit.

The above-described standard cooling methods are suitable for steels which are cooled relatively quickly, for example, by means of air. These steels are predominantly non-alloy steels of medium or low strength. High-grade steels, on the other hand, should not be conveyed onto conventional cooling beds because of their special hardness structure. This is because the required control of the cooling process which would be meaningful for the final quality cannot be carried out in cooling beds. High-grade steels must be placed at relatively high temperatures either in annealing boxes or in an annealing furnace. It is a disadvantage if the steel remains for extended periods in an abrasive cutting-off machine when the steel is cut to commercial lengths.

SUMMARY OF THE INVENTION

Therefore, it is the primary object of the present invention to provide a method and an arrangement for severing and further transporting for controlled cooling of individual rods from rolled sections, wherein the above-mentioned difficulties and technical limitations are overcome and, in addition to a standard cooling method by means of cooling bed for steels of medium or low strength, an additional possibility is provided for thermally treating and annealing special high-grade steels in a special manner in accordance with a desired final quality of the structure of the steel.

In accordance with the present invention, the rolled section is supplied to parting shears whose knives rotate on both sides of the section in a horizontal plane and which, when severing the section, displace or offset the resulting section ends in the horizontal plane laterally relative to each other by a certain distance.

The present invention provides the advantage that the rod is conveyed past the cooling bed and the manner of carrying out the cut severs the initially endless section into individual rods and simultaneously effects a lateral displacement of the severed rod as a result of the special manner of operation of knife arms during their rotation in a horizontal plane. This displacement is required for deceleration on a sliding surface and ensures that the newly created section end can overtake the laterally displaced severed preceding rod without impacting the preceding rod.

In accordance with a further development of the invention, a cut length is laterally displaced from the extended rolling line simultaneously with the severing cut at several locations of its length by means of rotation deflectors which rotate synchronously with the rotation shears in the horizontal plane. The simultaneous use of several rotation deflectors prevents thin and relatively high-tempered sections from being bent during the lateral displacement. In this manner, the severed rod is laterally displaced without deformation.

Another further development of the invention provides that a cut length is conveyed as an individual rod by the lateral displacement onto an inclined sliding and decelerating surface. On the sliding and decelerating surface, the rod is decelerated while a new section end passes the cut and laterally displaced end of the preceding rod without problems, while the severed individual rods are placed after deceleration into annealing boxes or in an annealing furnace by means of a transverse conveyor and are cooled in a controlled manner in the annealing boxes or the annealing furnace. It is also possible to divide the individual rods into commercial lengths, to collect the commercial lengths into layers and then cool the layers in a controlled manner in annealing boxes or in an annealing furnace.

The arrangement according to the present invention for severing and controlled cooling of individual rods from a rolled section, particularly from a steel section which emerges at final speed and hot from rolling from the rolling line of a finishing train, with parting shears and a cooling unit arranged next to the extended rolling line, for carrying out the above-described method, provides that the parting shears are rotation shears with knife carriers which rotate synchronously in opposite direction on both sides of the rolled section in a horizontal plane, wherein the knife carriers are provided with cams as rotation deflectors arranged behind the knives in the direction of rotation.

The configuration of parting shears according to the present invention in the form of horizontal shears with knife carriers constructed as rotation deflectors which rotate in opposite directions in a horizontal plane provides the advantage that, simultaneously with the severing cut, the resulting ends of the severed rod and of the subsequent section portion are laterally displaced relative to each other, so that the severed rod is displaced to the side and is decelerated and the subsequent section can move without problems past the end of the severed rod.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
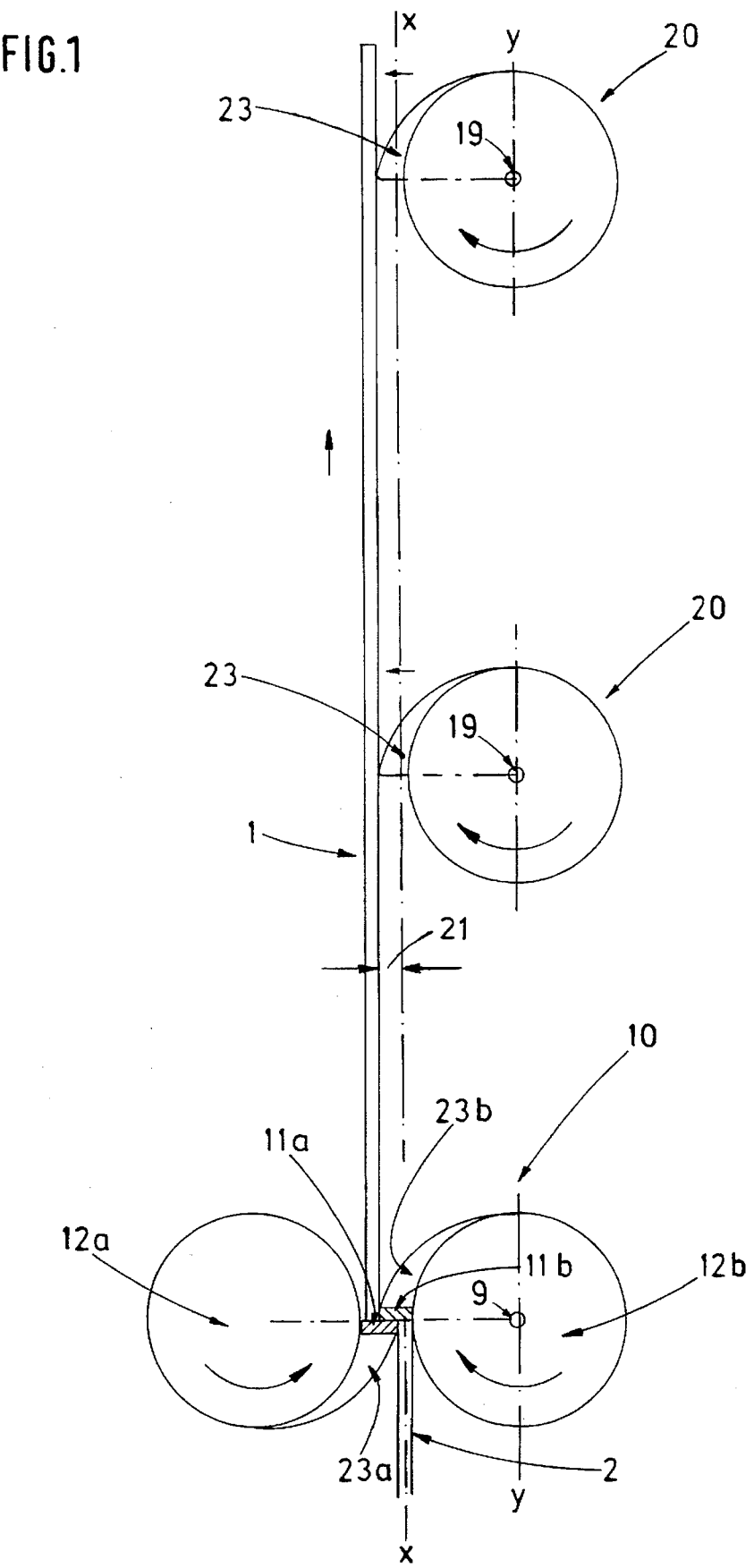
FIG. 1 is a top view of the arrangement according to the present invention including rotation shears with a pair of rotation deflectors arranged downstream of the rotation shears.

FIG. 1 of the drawing shows in a top view parting shears constructed as rotation shears 10. The rotation shears 10 include knife carriers 12a, 12b which rotate synchronously in opposite directions on both sides of the rolled section 2 in an approximately horizontal plane. The knife carriers are circular elements which are provided with radially projecting knives 11a, 11b. The knives 11a, 11b rest against cams 23a, 23b which are arranged behind the knives 11a, 11b in the direction of rotation. These cams 23a, 23b simultaneously serve as rotation deflectors which, when the section 2 is cut and an individual rod 1 is severed, laterally displace the individual rod 1 parallel to the extended rolling line x-x by a distance 21. In the illustrated embodiment, the individual rod 1 is displaced toward the left. This makes it possible for the subsequent rod 2 to be continued to be conveyed in the extended rolling line x-x past the severed rod 1 while maintaining its speed.

Several rotation deflectors 20 are arranged downstream of the rotation shears 10. For example, two rotation deflectors 20 are arranged equally spaced from each other over the longitudinal extension of the individual rod 1. The rotation deflectors 20 also have cams 23 and rotate in the horizontal plane synchronously with the rotation shears 10. The synchronous rotation is achieved, for example, by a synchronous coupling of the drives of the rotation deflectors 20 and the rotation shears 10. The interaction of the rotation shears 10 and the rotation deflectors 20 produces the advantage that an individual rod 1 is laterally displaced simultaneously at several locations without causing a deformation over the length of the, for example, relatively thin rod 1 which still has a high temperature during the lateral displacement.

FIG. 1 shows the rotation shears 10 exactly at the time of cutting the section 2 and severing the individual rod 1 from the section 2 and the displacement of the individual rod 1 parallel to the rolling line x-x. For this purpose, several rotation deflectors 20 are provided, wherein the center of rotation 9 of the rotation shears 10 and the centers of rotations 19 of the rotation deflectors 20 are arranged on a line y-y extending parallel to the extended rolling line x-x. When the diameters of the rotation deflectors 20 are different, the centers of rotation of the rotation deflectors 20 may also be located on a center line y-y displaced relative to the rolling line x-x.

Figure 2:
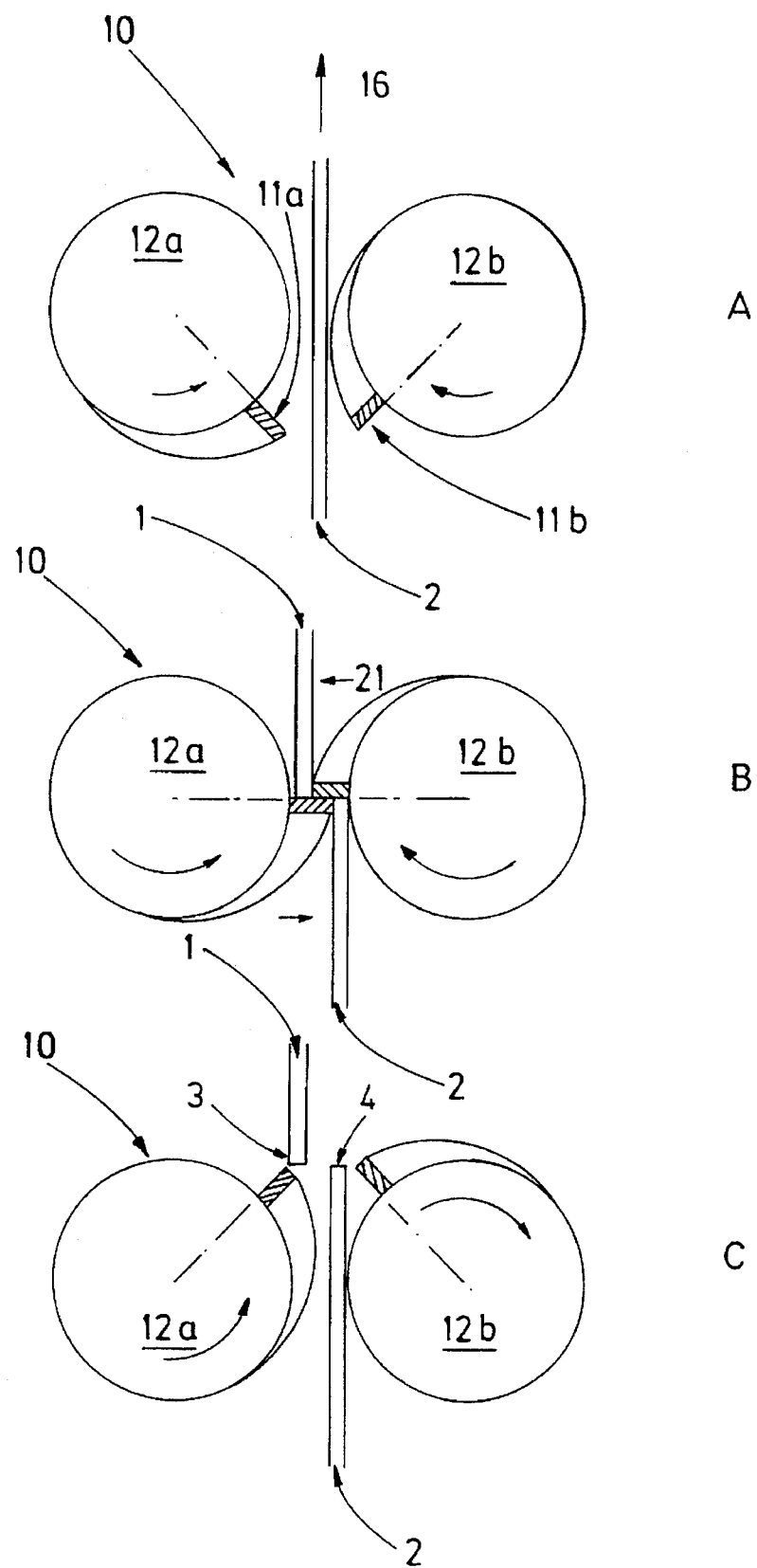
FIG. 2 is a top view showing three phases of operation of the rotation shears of FIG. 1.

FIG. 2 of the drawing shows a sequence of operating phases A, B, C of rotation shears 10 as the section 2 is being severed and the resulting individual rod 1 is simultaneously laterally displaced by the distance 21. In phase of operation A, initially the section 2 travels with rolling speed through the rotation shears 10 which rotate with the same circumferential speed of their cylindrical knife carriers 12a, 12b in a horizontal plane. The knives 11a, 11b are not yet in the cutting position. The cutting position is reached in phase of operation B. As is evident, simultaneously with the cutting of the section, the severed individual rod 1 is laterally displaced in accordance with arrow 21. The displacement is achieved because the knife carriers 12a, 12b of the rotation shears 10, which rotate in a horizontal plane on both sides of the section 2 to be severed, are provided with cams 23a, 23b acting as rotation deflectors, as is apparent from FIG. 1. The phase of operation C is the state at the end of the severing process.

FIG. 2 shows the end 3 of the severed rod 1 and the end 4 of the subsequent section 2. The severed individual rod 1 is now displaced toward the left as shown in FIG. 2 in the direction of arrow 21 onto an inclined sliding and decelerating surface 42, shown in FIG. 3, while the subsequent section 2 can be moved unimpededly at rolling speed past the severed rod 1 in the direction of arrow 16 by means of a roller conveyor 38, also shown in FIG. 3.

Figure 3:
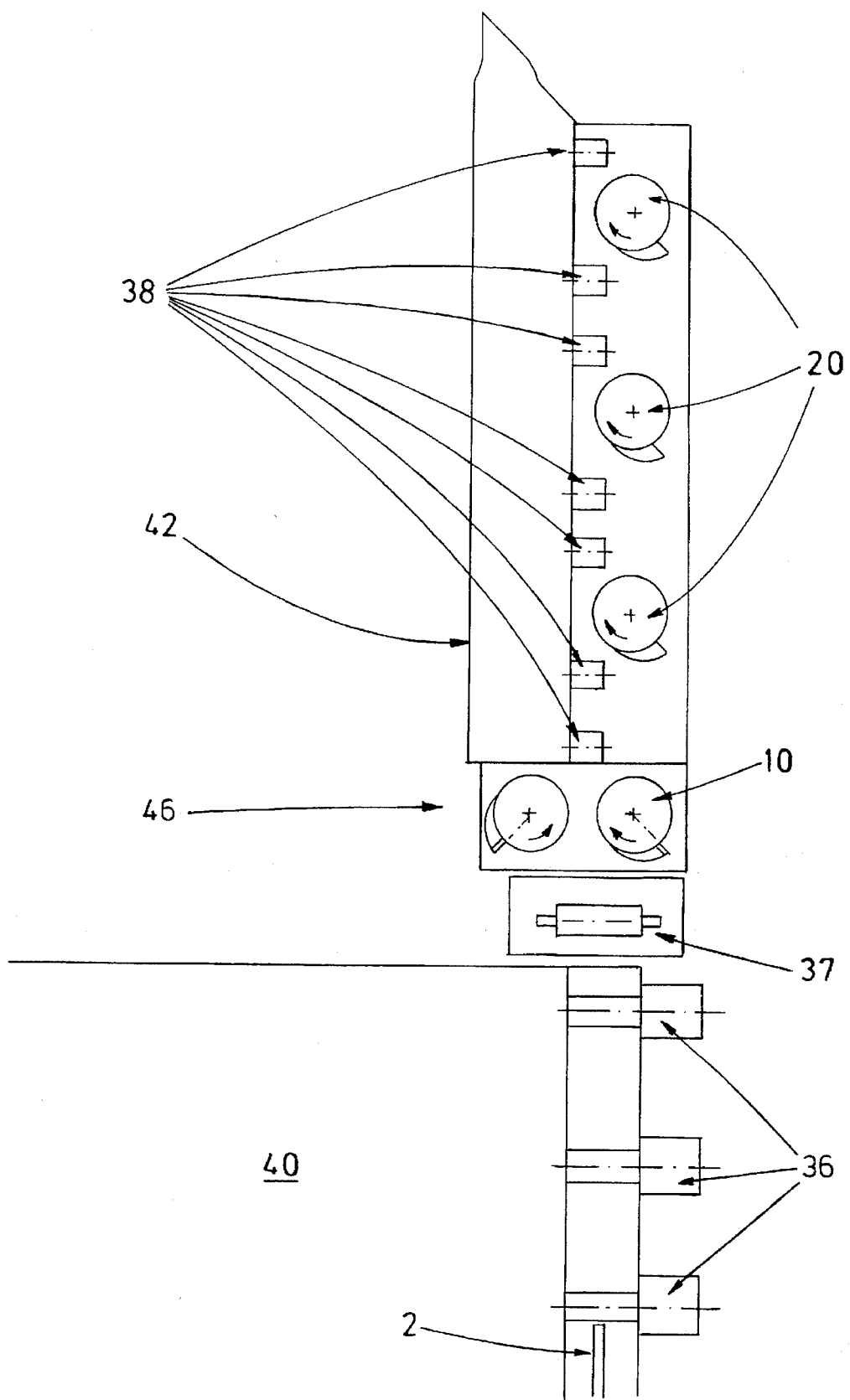
FIG. 3 is a top view, on a smaller scale, of an arrangement including cooling bed, run-out table, subsequently arranged rotation shears, rotation deflectors and inclined sliding and decelerating surface.

FIG. 3 shows a plant portion 46 arranged downstream of a rolling mill train. The plant portion 46 includes drivable conveyor rollers 36, an optional driver 37, rotation shears 10 with a row of subsequently arranged, preferably drivable, conveyor rollers 38 and several rotation deflectors 20 arranged also in a row and laterally next to the conveyor rollers 38, and a sliding and decelerating surface 42 next to the rollers 38. In the plant portion 46, the section 2 emerging from the rolling mill train is conveyed either at rolling speed or, after being severed by means of cooling bed shears 39 shown in FIG. 4, at a speed determined by the conveyor rollers 36 and by the driver 37 through the parting shears constructed as rotation shears 10. Subsequently, individual rods 1 are severed and displaced by means of the rotation deflectors 20 toward the side onto the inclined sliding and decelerating surface 42 and are conveyed from there by means of additional conventional transverse conveyor units, such as, chain conveyors etc., to subsequently arrange cooling units, for example, annealing boxes or annealing furnaces.

Figure 4:
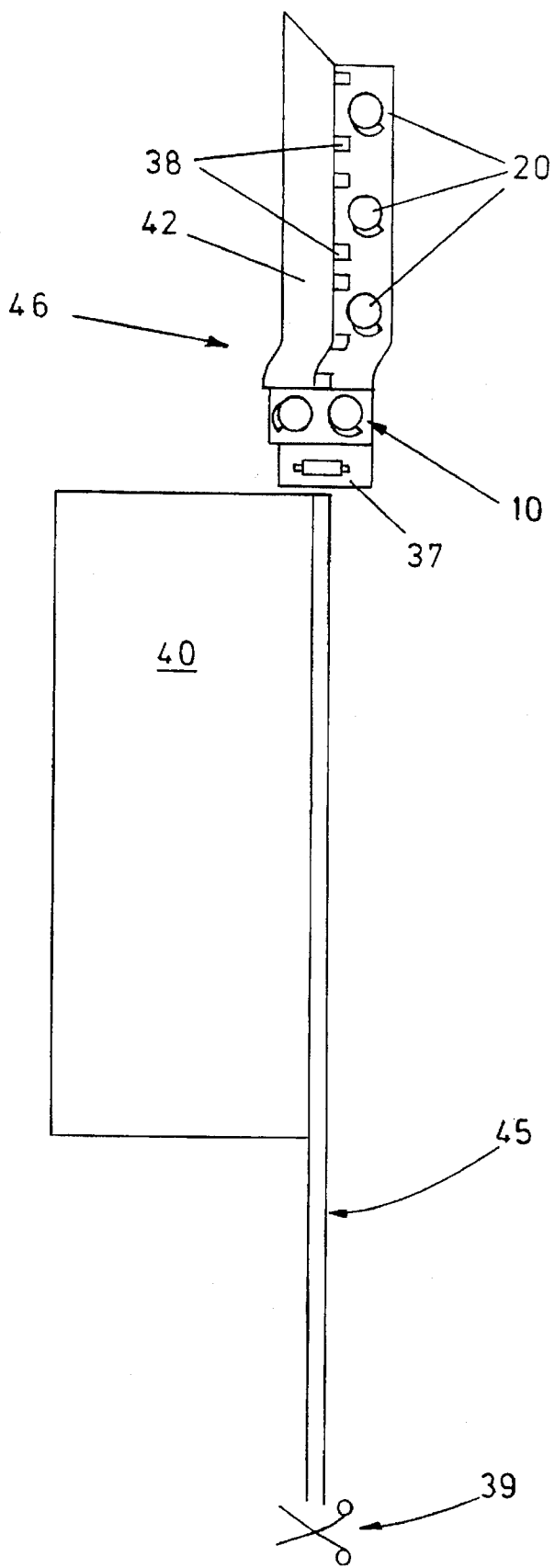
FIG. 4 is a top view, on an even smaller scale, of the arrangement of FIG. 3 with cooling bed shears, cooling bed, rotation shears, sliding and decelerating surface and subsequently arranged collecting chute.

FIG. 4 of the drawing shows, in a plant portion following a rolling mill train, cooling bed shears 39, a conveyor stretch 45, a cooling bed 40 and, in accordance with FIG. 3, the plant portion 46 with rotation shears 10, subsequently arranged conveyor rollers 38 and sliding and decelerating surface 42 which may be followed by a collecting chute. As is clear from FIG. 4, the conveying stretch 45 makes it possible to convey sections, for example, of high-quality tool steel, past the cooling bed 40, to cut the sections 2 by means of the rotation shears 10 into commercial lengths, to transversely laterally convey away the cut rods on the sliding end decelerating surface 42 and to decelerate the rods until they stand still, to collect the rods into layers and to subsequently further convey the layers into annealing boxes or into an annealing furnace for the controlled cooling.

By using the parting shears 10 constructed as rotation shears in horizontal arrangement together with the rotation deflectors 20, the plant portion 46 is capable in a surprisingly simple and advantageous manner to carry out fast cutting procedures which quickly follow each other while simultaneously laterally displacing the severed rods which can subsequently be conveyed to a controlled cooling and annealing process. On the other hand, other types of steel and particularly types of steel with low requirements with respect to the cooling process, are cooled on the normal cooling bed 40. For this purpose, it is also possible to use parting shears with knives rotating on a horizontal plane for cutting rolled sections into normal cooling bed lengths.

The invention is not limited by the embodiments described above which are presented as examples only but can be modified in various ways within the scope of protection defined by the appended patent claims.

We claim:

1. A method for severing and controlled cooling of individual rods from a rolled section which emerges hot from rolling at final speed from a rolling line of a finishing train, the method comprising dividing the section into cut lengths as the section travels through rotation shears comprising knives which rotate on both sides of the section in a horizontal plane, wherein each cut length has an end and the section has a front end adjacent the end of the cut length, laterally displacing the end of the cut length relative to the front end of the section by means of cams as deflectors mounted at the knives of the rotation shears by a distance in the horizontal plane, wherein the distance is such that the front end of the section can travel past the end of the cut length, and conveying each cut length to a cooling unit.

2. The method according to claim 1, wherein each cut length is laterally displaced from the rolling line simultaneously with being divided from the section by means of rotating cams as deflectors which are mounted at a distance behind the rotating shears in a direction of the rolling line and which rotate synchronously with the cams of the rotation shears.

3. The method according to claim 1, comprising conveying each cut length as an individual rod after being laterally displaced by the distance onto an inclined sliding and decelerating surface, decelerating the individual rod on the inclined and decelerating surface, while the front end of the section passes the laterally displaced end of the individual rod.

4. The method according to claim 1, comprising conducting sections of high-grade steel past a cooling bed to the rotation shears for dividing into cut lengths, placing the divided cut lengths after deceleration thereof into annealing boxes or into an annealing furnace, and cooling the cut lengths in a controlled manner in the annealing boxes or in the annealing furnace.

5. The method according to claim 4, further comprising dividing the cut lengths into commercial lengths, collecting the commercial lengths into layers, and introducing the layers into annealing boxes or into an annealing furnace.

6. The method according to claim 1, comprising dividing sections of less than high-grade steels in front of a cooling bed into cooling bed lengths, deflecting the cooling bed lengths onto the cooling bed, decelerating the cooling bed lengths and cooling the cooling bed lengths in a controlled manner on the cooling bed or on a separate component of the cooling bed.

7. An arrangement for severing and controlled cooling of individual rods from a rolled section which emerges hot from rolling at final speed from a rolling line of a finishing train, the arrangement comprising a cooling bed arranged next to the rolling line and parting shears mounted following the cooling bed in a direction of the rolling line, the parting shears comprising rotation shears with a first knife carrier carrying a first knife mounted on a first side of the section and a second knife carrier carrying a second knife mounted on a second side of the section, the knife carriers rotating synchronously in opposite directions in a horizontal plane, wherein each knife carrier is provided with a cam as a deflector for deflecting the individual rods, the cam of the first knife carrier being arranged behind the first knife in the direction of rotation of the first knife carrier and the cam of the second knife carrier being arranged in front of the second knife in the direction of rotation of the second knife carrier.

8. The arrangement according to claim 7, comprising at least one additional deflector rotating in a horizontal plane and arranged downstream of the parting shears in travel direction of the section, the at least one deflector having a cam for deflecting an individual rod, the at least one deflector being coupled to the parting shears by synchronous drives or drives for producing synchronous circumferential speeds of the knife carriers and the at least one deflector, further comprising an inclined sliding and decelerating surface mounted on a side opposite the at least one deflector.

9. The arrangement according to claim 8, comprising a plurality of deflectors arranged distributed over a length of the individual rod.

10. The arrangement according to claim 7, wherein the parting shears are arranged upstream of the cooling bed.

11. The arrangement according to claim 7, wherein the parting shears are arranged downstream of the cooling bed.

* * * * *